US011879281B2

(12) United States Patent
Welbig et al.

(10) Patent No.: US 11,879,281 B2
(45) Date of Patent: Jan. 23, 2024

(54) AUTOMATIC WINDOW SASH INTERLOCK

(71) Applicant: Amesbury Group, Inc., Edina, MN (US)

(72) Inventors: Tyler Welbig, Harrisburg, SD (US); Allen Rickenbaugh, Sioux Falls, SD (US); Chad Kramer, Sioux Falls, SD (US); Gary E. Tagtow, Sioux Falls, SD (US); Douglas John Criddle, Sioux Falls, SD (US)

(73) Assignee: Amesbury Group, Inc., Edina, MN (US)

( * ) Notice: Subject to any disclaimer, the term of this patent is extended or adjusted under 35 U.S.C. 154(b) by 313 days.

(21) Appl. No.: 17/104,205

(22) Filed: Nov. 25, 2020

(65) Prior Publication Data

US 2021/0156181 A1 May 27, 2021

Related U.S. Application Data

(60) Provisional application No. 62/940,077, filed on Nov. 25, 2019.

(51) Int. Cl.

*E05C 3/00* (2006.01)
*E05D 15/22* (2006.01)
*E06B 3/50* (2006.01)
*E05D 15/48* (2006.01)
*E05C 7/00* (2006.01)

(52) U.S. Cl.

CPC .............. *E05C 3/008* (2013.01); *E05D 15/22* (2013.01); *E05D 15/48* (2013.01); *E06B 3/5063* (2013.01); *E05C 2007/007* (2013.01); *E05D 2015/485* (2013.01)

(58) Field of Classification Search

CPC ...... E05C 3/008; E05C 3/12; E05C 2007/007; E05C 3/046; E05D 15/48; E05D 2015/485; E05D 15/22; E06B 3/5063

See application file for complete search history.

(56) References Cited

U.S. PATENT DOCUMENTS

| | | | | |
|---|---|---|---|---|
| RE24,520 E * | 8/1958 | Conrad | E05D 15/48 | 160/369 |
| 3,522,675 A * | 8/1970 | Metzger | E06B 3/44 | 49/423 |
| 5,301,989 A * | 4/1994 | Dallmann | E05B 65/0876 | 292/DIG. 31 |
| 6,871,885 B2 * | 3/2005 | Goldenberg | E05B 65/0841 | 292/DIG. 20 |
| 7,490,873 B1 * | 2/2009 | Ricke | E05B 65/0876 | 292/DIG. 47 |
| 7,506,475 B2 * | 3/2009 | Lundahl | E05D 13/1276 | 49/506 |

(Continued)

*Primary Examiner* — Justin B Rephann

(74) *Attorney, Agent, or Firm* — Merchant & Gould P.C.

(57) ABSTRACT

A window sash interlock includes a housing configured to mount to a side rail of a window sash. The housing includes a front face that substantially aligns with a surface of the side rail. A locking member is pivotably coupled to the housing about a pivot axis. The locking member is disposed at least partially within the housing and is movable between at least a locked position and an unlocked position. The locking member is biased so as to automatically return to the unlocked position, and in the unlocked position, the locking member at least partially extends from the front face of the housing.

14 Claims, 11 Drawing Sheets

(56) References Cited

U.S. PATENT DOCUMENTS 8,550,507 B2 * 10/2013 Barton ...................... E05C 3/12 292/228
8,789,862 B2 * 7/2014 Liang ........................ E05C 3/14 292/300
8,955,255 B2 * 2/2015 DeBoer ..................... E05C 1/12 49/176
9,273,486 B2 * 3/2016 Mansueto ................. E05C 7/00
9,840,860 B2 * 12/2017 Liang .................. E05B 63/0056
10,538,948 B1 * 1/2020 Johnson .............. E05B 63/0056
10,927,578 B2 * 2/2021 Vander Bent, Jr. ... E06B 3/9647
10,961,748 B2 * 3/2021 Albrecht ............... E05C 9/1833
11,248,396 B2 * 2/2022 Lammers ............ E05B 47/0038
2003/0205903 A1 * 11/2003 Kelley ................ E05B 65/0876 292/241
2007/0157521 A1 * 7/2007 Ito ......................... E06B 3/5063 49/185
2007/0180770 A1 * 8/2007 Flory ...................... E05C 3/046 49/185
2007/0209281 A1 * 9/2007 Flory ...................... E05B 63/14 49/183
2007/0222233 A1 * 9/2007 Liang ...................... E05C 17/50 292/338
2007/0222234 A1 * 9/2007 Liang ...................... E05C 17/50 292/338
2008/0022728 A1 * 1/2008 Flory ...................... E05C 3/046 70/90
2008/0302017 A1 * 12/2008 Phillips ..................... E05C 1/06 292/137
2009/0265996 A1 * 10/2009 Flory .................. E05B 65/0841 49/70
2010/0132263 A1 * 6/2010 Flory ...................... E05D 15/22 49/394
2011/0011002 A1 * 1/2011 Guillemette .......... E06B 3/5063 49/394
2011/0192089 A1 * 8/2011 Barton ...................... E05C 3/16 292/195
2013/0283694 A1 * 10/2013 DeBoer ............... E05B 15/0053 49/421
2014/0069017 A1 * 3/2014 Barton ...................... E05C 3/12 49/506
2014/0259946 A1 * 9/2014 Mansueto ................. E06B 3/42 292/336.3
2016/0319577 A1 * 11/2016 Liang ........................ E05C 3/14
2019/0003208 A1 * 1/2019 Albrecht ............... E05B 53/003
2019/0024412 A1 * 1/2019 Lammers ............ E05B 15/0205

* cited by examiner

AUTOMATIC WINDOW SASH INTERLOCK

CROSS-REFERENCE TO RELATED APPLICATIONS

This application claims the benefit of and priority to U.S. Provisional Patent Application No. 62/940,077, filed Nov. 25, 2019, which is incorporated by reference herein in its entirety.

INTRODUCTION

Window sash locks typically prevent vertical movement of a window sash by selectively engaging a rotatable cam disposed in a first window sash with a fixed keeper disposed on a second window sash. These window sash locks are disposed proximate a central portion of a top rail of a window sash and form only a single locking point for the window sash.

SUMMARY

In an aspect, the technology relates to a window sash interlock including: a housing configured to mount to a side rail of a window sash, wherein the housing includes a front face that substantially aligns with a surface of the side rail; and a locking member pivotably coupled to the housing about a pivot axis, wherein the locking member is disposed at least partially within the housing, wherein the locking member is movable between at least a locked position and an unlocked position, wherein the locking member is biased so as to automatically return to the unlocked position, and wherein in the unlocked position, the locking member at least partially extends from the front face of the housing.

In an example, the locking member is configured to be depressed at least partially within the housing from the unlocked position. In another example, the locking member includes at least one wing configured to engage with a window jamb to depress the locking member when the window sash tilts. In yet another example, in the locked position, the locking member at least partially extends from the front face of the housing. In still another example, the locking member includes a locking surface configured to engage with a keeper to move the locking member from the unlocked position towards the locked position. In an example, the window sash interlock further includes a keeper configured to mount to a window jamb, the keeper includes a bottom edge and two opposing side edges. In another example, a gap is defined in the bottom edge of the keeper shaped and sized to allow a pivot bar of the window sash to pass through.

In another aspect, the technology relates to a sash interlock including: a housing defining an interior cavity, wherein the interior cavity is open at a front face of the housing; a locking member pivotably coupled to the housing at a pivot axis and disposed at least partially within the interior cavity, wherein the locking member includes a locking surface and a front surface; and at least one biasing member coupled to the locking member and disposed within the interior cavity, wherein the at least one biasing member is configured to bias a position of the locking member relative to the front face of the housing, and wherein the locking member is pivotable in either direction around the pivot axis from the biased position.

In an example, the locking surface is curved. In another example, the locking surface includes a locking lug. In yet another example, the locking member includes a pair of tapered wings extending from the front face. In still another example, a pair of notches are defined in the housing at the front face sized and shaped to selectively receive at least a portion of the pair of tapered wings. In an example, the at least one biasing member includes a torsion spring. In another example, the locking member is pivotable around the pivot axis further in a direction that is out of the interior cavity than in a direction that is into the interior cavity.

In another aspect, the technology relates to a window system including: a window jamb; a window sash mounted to the window jamb, wherein the window sash is configured to slide relative to the window jamb; a sash interlock coupled to the window sash, wherein the sash interlock includes a locking member pivotable relative to the window sash; and a keeper coupled to the window jamb, wherein the keeper includes at least one locking edge that extends in a direction substantially orthogonal to the sliding movement of the window sash, and wherein the at least one locking edge is configured to engage the locking member of the sash interlock and pivot the locking member at least partially out from the window sash.

In an example, the window sash is configured to tilt relative to the window jamb, and the window jamb is configured to engage the locking member of the sash interlock and pivot the locking member at least partially into the window sash. In another example, the at least one locking edge includes a gap sized and shaped to allow a pivot bar of the window sash to pass through. In yet another example, the locking member includes a locking lug at least partially received within the gap when engaged with the keeper. In still another example, the sash interlock further includes at least one biasing member coupled to the locking member, and the locking member is biased via the biasing member to automatically return to an unlocked position after disengagement with the keeper and allow the window sash to slide within the window jamb. In an example, the locking member protrudes at least partially from the window sash in the unlocked position.

BRIEF DESCRIPTION OF THE DRAWINGS

There are shown in the drawings, examples that are presently preferred, it being understood, however, that the technology is not limited to the precise arrangements and instrumentalities shown.

DETAILED DESCRIPTION

The examples described herein provide a sash interlock for a sliding and tilting window sash with an engagement point for a corresponding keeper in a window jamb that is fully automatic and does not require any extra interaction from the window operator (e.g., the user). The engagement point of the sash interlock automatically engages with the keeper when the sash is shut and generates increased design pressure and impact resistance for the window system. The engagement point also automatically disengages from the keeper when the sash is opened. Furthermore, the engagement point fully retracts into a housing when the sash is tilted out of the window jamb. This operation of the sash interlock is enabled by the angular geometry of a locking member and a biasing member that biases the locking member to automatically return to an unlocked position from both a locked position and a depressed position.

Figure 1:
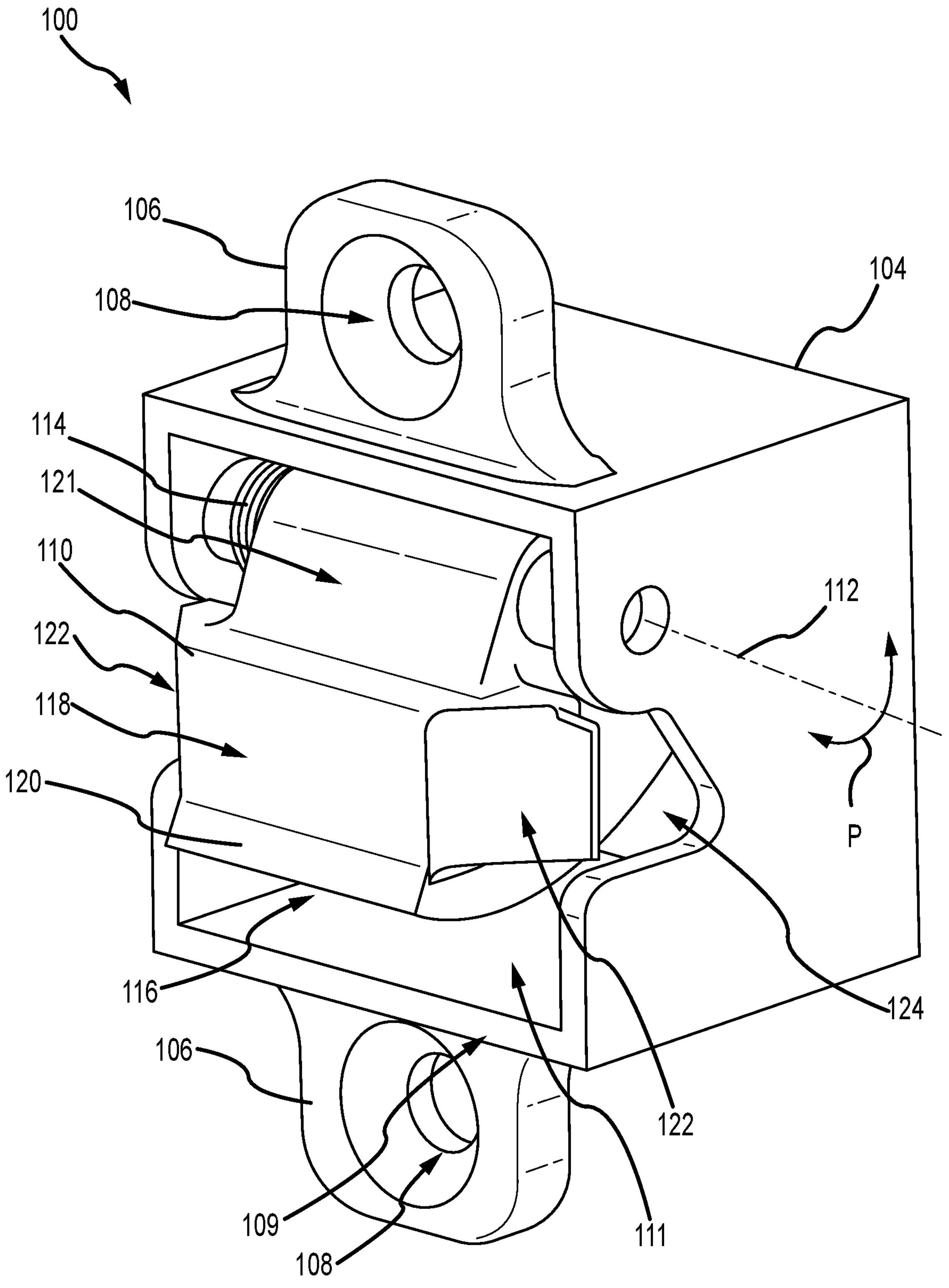
FIG. 1 is a perspective view of an exemplary sash interlock for a window sash in an unlocked position.
Figure 3:
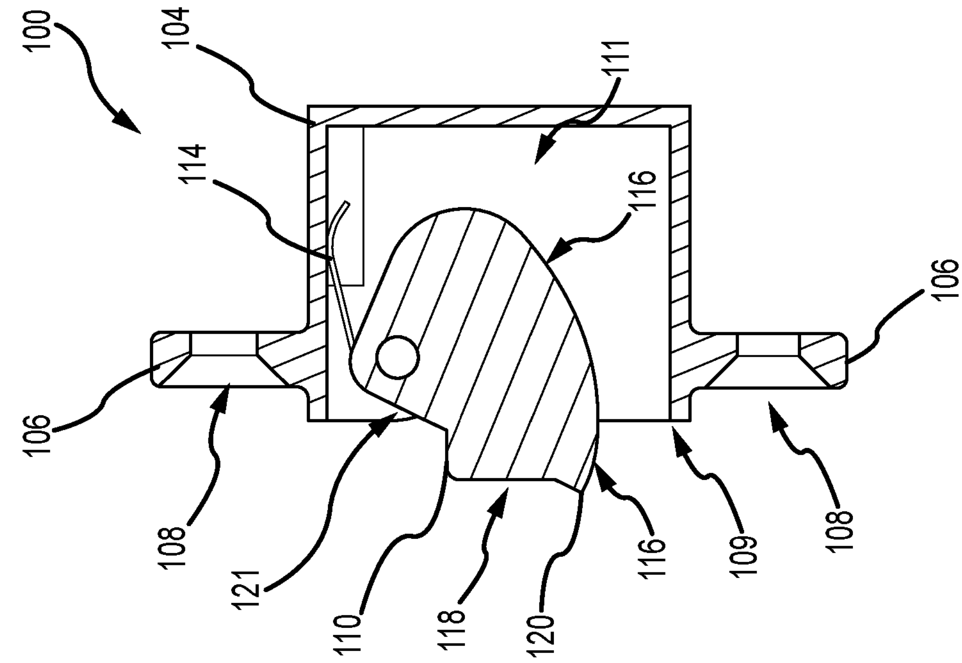
FIG. 3 is a cross-sectional view of the sash interlock shown in FIG. 1.
Figure 2:
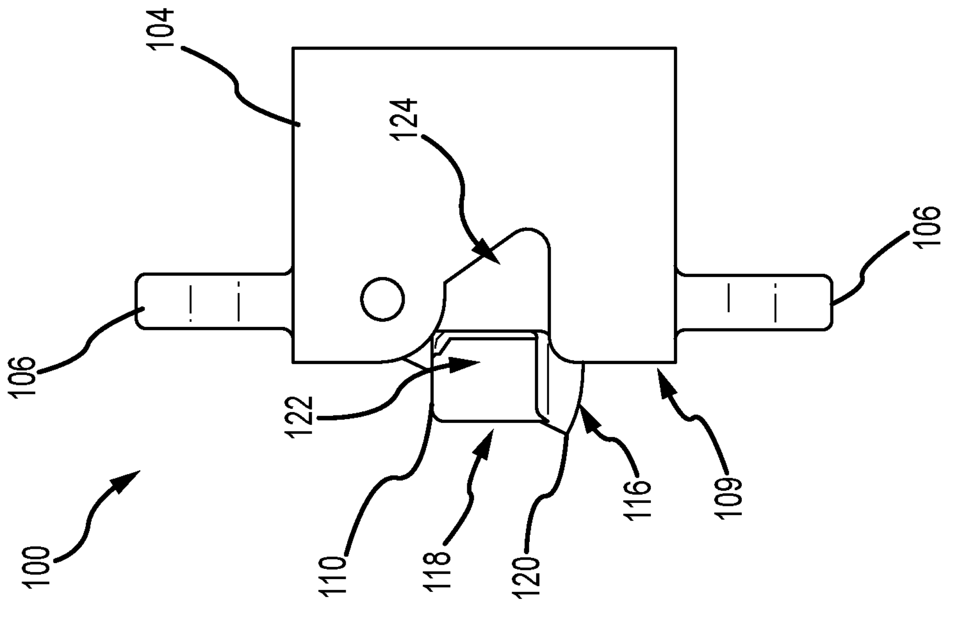
FIG. 2 is a side view of the sash interlock shown in FIG. 1.

FIG. 1 is a perspective view of an exemplary sash interlock 100 for a window sash 102 (shown in FIG. 7) in an unlocked position. FIG. 2 is a side view of the sash interlock 100. FIG. 3 is a cross-sectional view of the sash interlock shown 100. Referring concurrently to FIGS. 1-3, the sash interlock 100 includes a housing 104 that is configured to mount to a side rail 128 (shown in FIG. 7) of the window sash 102. For example, the housing 104 includes a pair of top and bottom tabs 106 with apertures 108 so that a rear end of the housing 104 can be recessed at least partially within the window sash and secured thereto with one or more fasteners (not shown). The housing 104 has a front face 109 that is configured to substantially align with a side surface of the side rail. The housing 104 defines an interior cavity 111 that is open at the front face 109 of the housing 104. In the example, the housing 104 is substantially rectangular in shape, however, the housing 104 can be any shape and/or size that enables the sash interlock 100 to function as described herein. For example, the configuration of the housing 104 and/or tabs 106 can change to accommodate varying structures of the window sash 102.

The sash interlock 100 also includes a locking member 110 that is disposed at least partially within the interior cavity 111 of the housing 104. The locking member 110 is pivotably mounted within the housing 104 so that the locking member 110 can pivot P about a pivot axis 112. In the example, the pivot point of the locking member 110 is located towards an upper and front position within the housing 104. In an aspect, the pivot point of the locking member 110 may substantially align and be positioned between the top and bottom tabs 106. The locking member 110 at least partially extends from the front face 109 of the housing 104 in the unlocked position. A biasing member 114 (e.g., a torsion spring) is coupled to the locking member 110 and is disposed within the interior cavity 111 of the housing 104. The biasing member 114 is configured to bias a position of the locking member 110 and relative to the front face 109 of the housing 104 and into the unlocked position illustrated in FIGS. 1-3. In an aspect, two biasing members 114 can be used, one on each side of the locking member 110.

The locking member 110 is configured to pivot P about the pivot axis 112 from the illustrated unlocked position in FIGS. 1-3. In the example, the locking member 110 can pivot P in both directions from the unlocked position and either further (e.g., depressed) into the housing 104 or further (e.g., extended) out of the housing 104 and in relation to the unlocked position. In an aspect, the biasing member 114 includes a torsion spring such that the locking member 110 is pivotable in either direction around the pivot axis 112 from the biased home position. Additionally, the biasing member 114 biases the locking member 110 so that the locking member 110 is configured to automatically return to the unlocked position after being moved away from the unlocked position.

In the example, the locking member 110 includes a locking surface 116 configured to engage with a keeper (e.g., the keeper 200 shown in FIG. 6) that moves the locking member 110 from the unlocked position. The locking surface 116 is disposed on the bottom of the locking member 110 and opposite the pivot axis 112. In one example, the locking surface 116 is substantially curved and the curved surface is at least partially disposed within the interior cavity 111 in the unlocked position. Additionally, at least a portion of the locking surface 116 extends from the front face 109 of the housing 104 in the unlocked position. The locking member 110 also includes a front surface 118 that extends upward from the front end of the locking surface 116. In one example, a protruding lip 120 may be between the locking surface 116 and the front surface 118. In the example, the front surface 118 is outwardly offset from the front face 109 of the housing 104 when in the unlocked position. The front surface 118 can be substantially planar and parallel to the front face 109 of the housing 104. Above the front surface 118 the locking member 110 includes a stop surface 121. By protruding a portion of the locking member 110 out from the housing 104, the locking member 110 is configured to engage the keeper and move the locking member 110 as described herein during operation of the window sash.

Additionally, the locking member 110 includes a pair of wings 122 disposed on both sides of the front surface 118. The wings 122 are configured to engage with the return legs of the window jamb to depress the locking member 110 at least partially into the interior cavity 111 of the housing 104 when the window sash tilts. The wings 122 can be oblique surfaces and taper in an outwards direction from the front surface 118. In the example, the wings 122 are extensions of the locking member 110, and thus, the width of the locking member 110 at the wings 122 is greater than the width of the interior cavity 111 of the housing 104. As such, the housing 104 includes notches 124 so that the locking member 110 can pivot into the housing 104.

When the locking member 110 is in the unlocked position, a portion of the locking member 110 protrudes from the front face 109 of the housing 104. More specifically, the front surface 118 and the lip 120 are positioned out of the housing 104. Additionally, a portion of the locking surface 116, the stop surface 121, and the wings 122 extend out of the housing 104. In the example, the tips of the wings 122 also extend at least to the sides of the housing 104. As such, each side of the housing 104 includes the notch 124 to enable the locking member 110 to pivot into the housing 104 when the window sash is tilted. In the example, the sash interlock 100 is configured to move from the unlocked position towards either a locked position that is described below in reference to FIG. 4 or a depressed position that is described below in reference to FIG. 5. The locked position is induced with the locking member 110 engaging a corresponding keeper, such as the keeper described below in FIG. 6, and so as to induce an interlock between the window sash and window jamb.

In operation, the sash interlock 100 is mounted in a middle section of the window sash and between the top and bottom rail. When the window sash is closed, the keeper engages with the locking surface 116 to pivot the locking member 110 at least partially out of the housing 104. This configuration of the sash interlock 100 provides a interlock engagement point for the window sash with the window jamb that is different than the typical sash lock point that is on the top rail of the window sash. Additionally, the sash interlock 100 increases the window's resistance to higher design pressures and impact loading as the window sash has another point of engagement with the window jamb. Because the locking member 110 can also be depressed into the housing 104, when the window sash is tilted, the window jamb engages with one of the wings 122 to depress the locking member 110. This configuration of the sash interlock 100 enables the window sash to still be allowed to tilt with the additional engagement component of the sash interlock 100. The engagement of the locking member 110 with the keeper is completely automatic and induced by the typical movement of the window sash during operation (e.g., sliding and tilting). As such, the window operator (e.g., user) does not need to manually position any component of the sash interlock 100.

Figure 4:
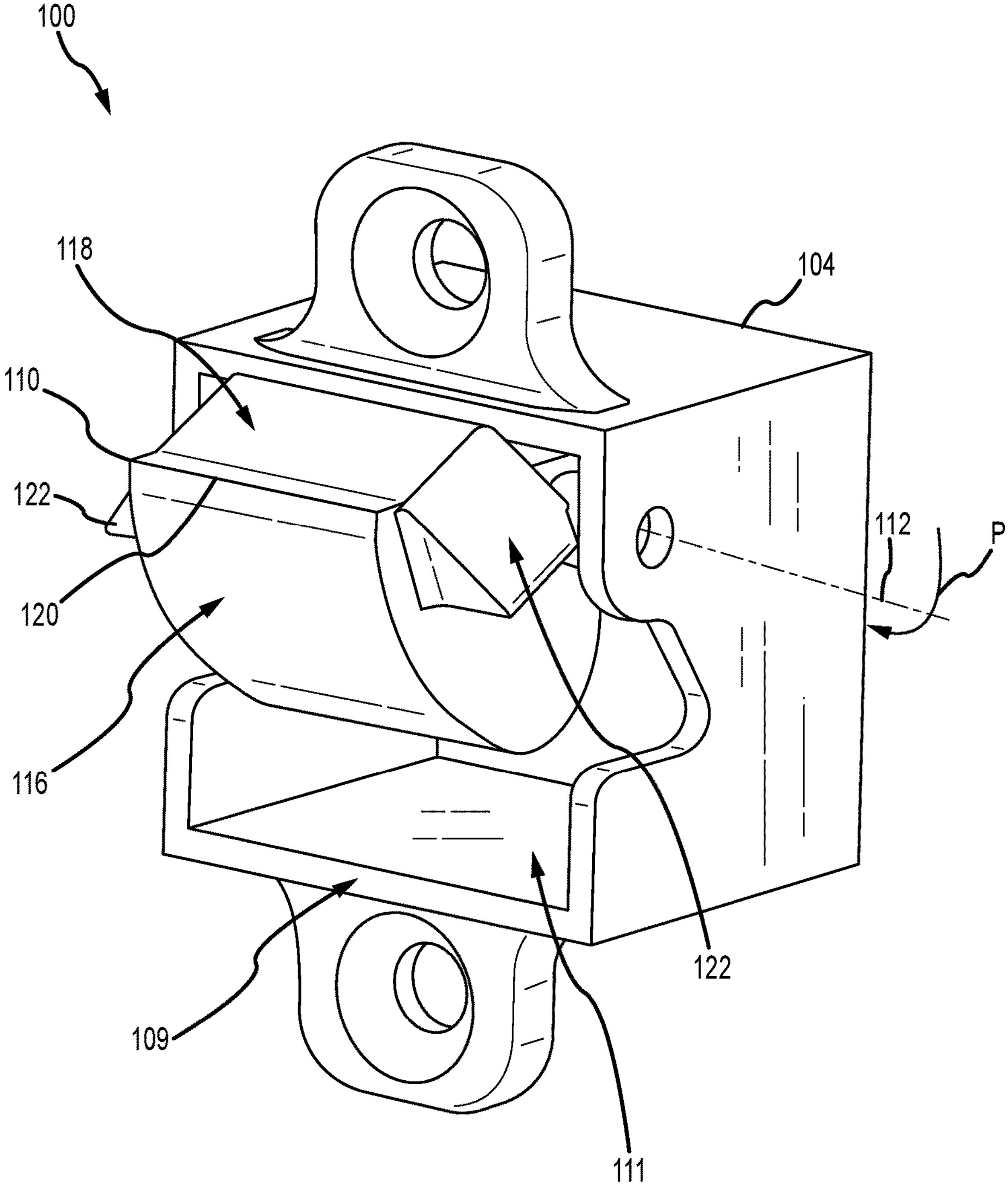
FIG. 4 is a perspective view of the sash interlock in a locked position.

FIG. 4 is a perspective view of the sash interlock 100 in a locked position. Certain components are described above, and thus, are not necessarily described further. In the locked position, the force of the biasing member 114 (shown in FIG. 1) is overcome and the locking member 110 is pivoted P in an upwards direction about the pivot axis 112. In the example, the top of the housing 104 may form the upper limit of the pivot movement of the locking member 110 when engaged with the stop surface 121 (shown in FIG. 3). When the locking member 110 is in the locked position, the locking member 110 at least partially extends from the front face 109 of the housing 104. The lip 120 extends further outwards from the front face 109 of the housing 104 when compared to the unlocked position (e.g., FIGS. 1-3). As such, the locking surface 116, the front surface 118, and the wings 122 also extend further out from the front face 109 of the housing 104. In an aspect, the locking surface 116 may be the surface of the locking member 110 that extends the furthest out from the housing 104.

In the example, the locking surface 116 of the locking member 110 is configured to engage with a keeper (e.g., the keeper 200 shown in FIG. 6) on the window jamb and move the locking member 110 from the unlocked position (shown in FIGS. 1-3) towards the locked position as shown in FIG. 4. The engagement between the keeper and the locking member 110 is induced by the window sash 102 (shown in FIG. 7) sliding within the window jamb towards a closed (e.g., shut) configuration. When the locking surface 116 of the locking member 110 is disengaged from the keeper by the sash sliding within the jamb towards the open configuration, the locking member 110 automatically returns towards the unlocked position because that is the biased position via the biasing member 114.

Figure 5:
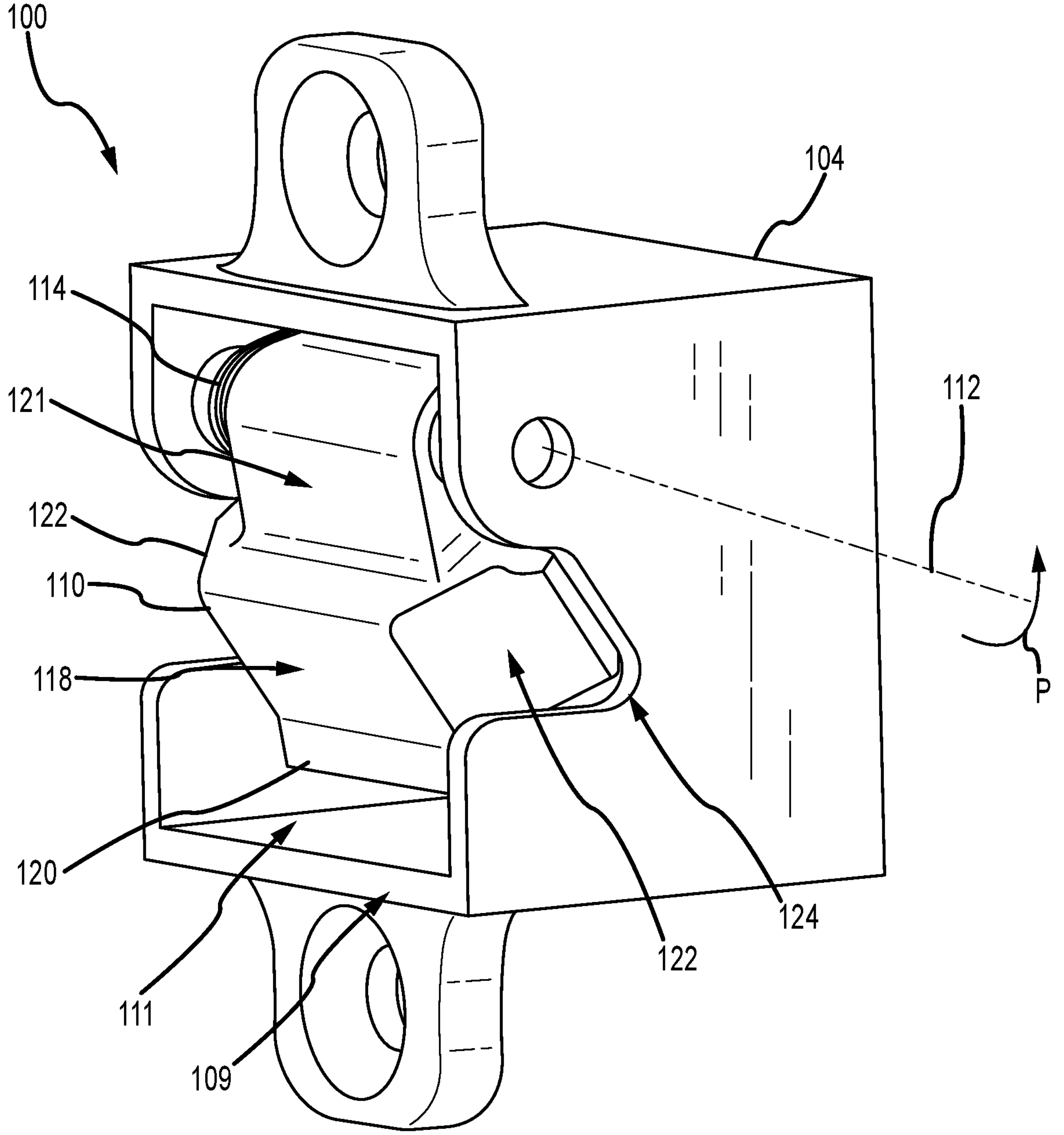
FIG. 5 is a perspective view of the sash interlock in a depressed position.

FIG. 5 is a perspective view of the sash interlock 100 in a depressed position. Certain components are described above, and thus, are not necessarily described further. In the depressed position, the force of the biasing member 114 is overcome and the locking member 110 is pivoted P in a downwards direction about the pivot axis 112. In the example, the notches 124 may form the downward limit of the pivot movement of the locking member 110 when engaged with the wings 122. In other examples, the rear of the housing 104 may form the downward limit for pivoting the locking member 110. When the locking member 110 is in the depressed position, the locking member 110 may be depressed completely within the interior cavity 111 of the housing 104. For example, the lip 120 and the locking surface 116 (shown in FIGS. 1-3) may be disposed completely within the housing 104. In other examples, a portion of the locking member 110 may extend from the front face 109 of the housing 104. In the example, the pivoting angle around the pivot axis 112 for the depressed position is less than the pivoting angle around the pivot axis for the locked position (shown in FIG. 4). As such, the locking member is pivotable around the pivot axis further in a direction that is out of the interior cavity 111 (e.g., locked position) than in a direction that is into the interior cavity 111 (e.g., depressed position).

In the example, the wings 122 of the locking member 110 are configured to engage with the return legs of the window jamb to move the locking member 110 from the unlocked position (shown in FIGS. 1-3) towards the depressed position as shown and once the sash interlock 100 is clear of the keeper. The engagement between the window jamb and the locking member 110 is induced by the window sash 102 (shown in FIG. 7) tilting in the jamb. When the wings 122 of the locking member 110 are disengaged from the return legs of the window jamb, the locking member 110 automatically returns towards the unlocked position because that is the biased position via the biasing member 114.

Figure 6:
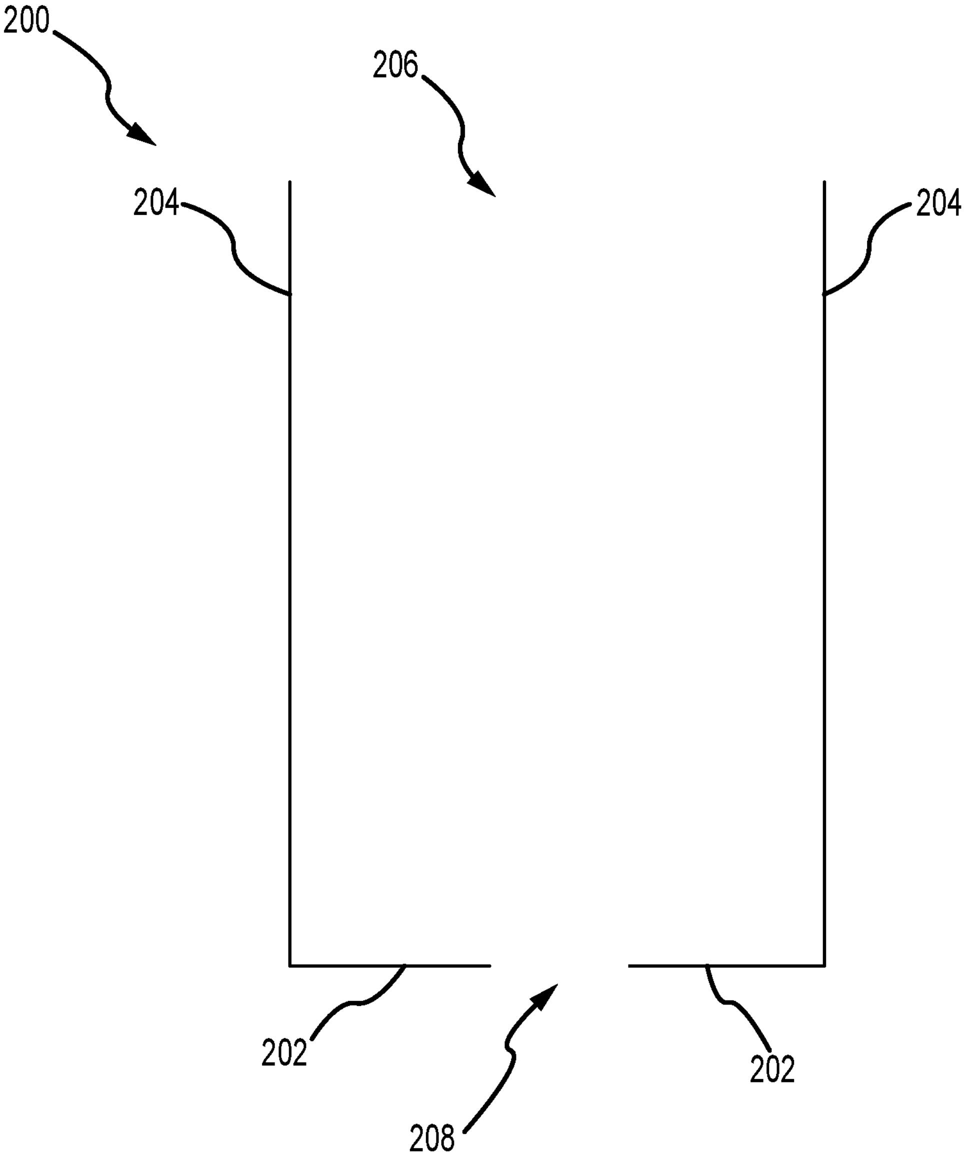
FIG. 6 is a schematic view of an exemplary keeper for use with the sash interlock shown in FIGS. 1-5.

FIG. 6 is a schematic view of an exemplary keeper 200 for use with the sash interlock 100 (shown in FIGS. 1-5). The keeper 200 is configured to mount to a window jamb and selectively engage with the locking member 110 (shown in FIGS. 1-5) of the sash interlock 100. In the example, the keeper 200 includes a bottom edge 202 and two opposing side edges 204 forming an opening 206 therebetween. The opening 206 is sized and shaped to at least partially receive the locking member 110 of the sash interlock 100. Additionally, the bottom edge 202 has a gap 208 so that the bottom edge 202 is split into two discrete portions. In the example, the gap 208 has a thinner width than the opening 206. In the example, the bottom edge 202 extends in a direction substantially orthogonal to the sliding movement of the window sash within the window jamb and the side edges 204 extend in a direction substantially parallel to the sliding movement of the window sash.

The keeper 200 itself can take any shape or form that enables the sash interlock 100 to function as described herein. In one example, the keeper 200 may be a plate that couples to the front of the window jamb and at least partially covers the jamb slot. In some examples, the window jamb may be reinforced to form the keeper 200. In another example, the keeper may be formed as an insert cover that replaces a portion of the window jamb. In any of these examples, the keeper 200 is configured to not interfere with the window balance that is disposed within the window jamb and behind the keeper 200. Some examples of keepers are described further below and in reference to FIGS. 11-13.

The bottom edge 202 of the keeper 200 is configured to engage with the locking surface 116 (shown in FIGS. 1-5) of the locking member 110 and move the locking member 110 from the unlocked position towards the locked position when the window sash is sliding across the keeper 200 to close. Additionally, when the sash interlock 100 is in the locked position (e.g., FIG. 4) the wings 122 can engage with the side edges 204 to increase window sash resistance to higher design pressures and impact loads. The gap 208 is shaped and sized within the keeper 200 so that during operation of the window sash, a pivot bar (not shown) of the window sash can pass through the keeper 200 as required or desired. A height of the side edges 204 can define an opening height that the window sash must clear before being enabled to tilt out of the window jamb.

Figure 7:
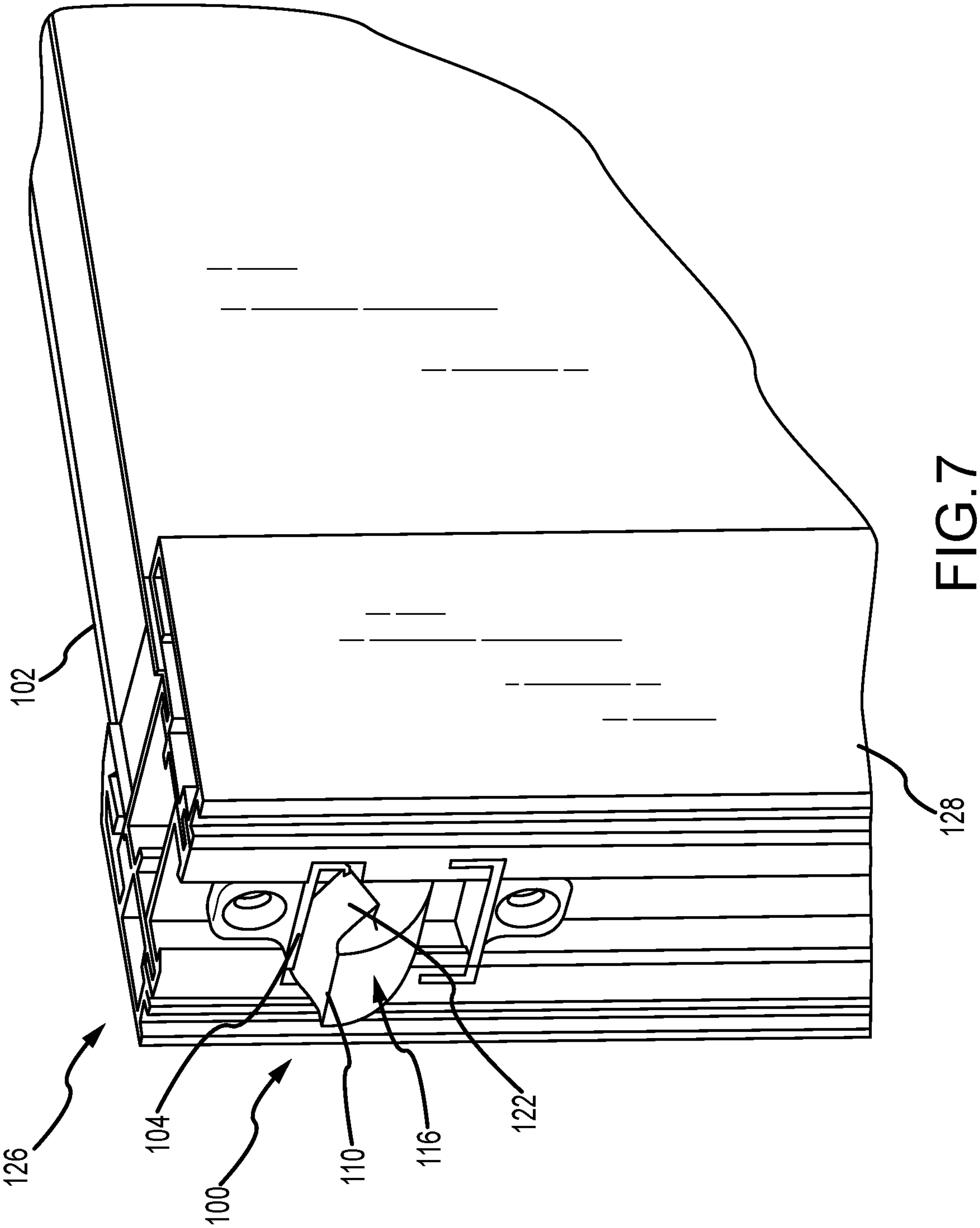
FIG. 7 is a perspective view of the sash interlock installed within the window sash and in the locked position.

FIG. 7 is a perspective view of the sash interlock 100 installed within the window sash 102 and in the locked position. In operation and with continued reference to FIG. 6, the window sash 102 is configured to be part of a window system 126 that includes a window jamb (not shown). In an aspect, the window system 126 can be a double-hung window with both the upper and lower window sash 102 configured to slide vertically so that the windows can open and close, as well as tilt out of the plane of the window jamb. In other examples, the window system 126 can be a single-hung window (e.g., where only the lower sash slides and tilts out) as required or desired. The sash interlock 100 is installed within a side rail 128 of a window sash 102 and the keeper 200 is installed on the corresponding window jamb. In other examples, the sash interlock 100 may be installed in the window jamb and the keeper 200 can be installed on the window sash 102. In the example, the sash interlock 100 is disposed between a top rail (not shown) and a bottom rail (not shown) of the window sash 102, and thus, in an intermediate position on the side rail 128 away from the corners. In an aspect, the sash interlock 100 may be disposed proximate the top rail and above the midpoint of the side rail 128.

The sash interlock 100 is coupled to the window sash 102 so that the locking member 110 is pivotable relative to the window sash 102. The keeper 200 is installed at a height on the window jamb so that as the window sash 102 is lowered into a closed position, the locking surface 116 of the locking member 110 contacts the bottom locking edge 202 of the keeper 200 and pivots the locking member 110 into the locked position as shown in FIG. 7 as the sash interlock 100 slides across the keeper 200. Thus, the locking member 110 is pivoted at least partially out and away from the window sash 102. This engagement between the keeper 200 and the sash interlock 100 also moves the wings 122 adjacent to the side edges 204 of the keeper 200. Accordingly, the sash interlock 100 restricts transverse (e.g., substantially perpendicular to the plane of the window sash 102) movement of the window sash 102. Additionally, the sash interlock 100 when engaged with the keeper 200 increases the design pressure and impact resistance of the window sash 102 by forming a transverse engagement point. As such, the sash interlock 100 increases security and structural performance of the window system 126.

When the window sash 102 is being opened (e.g., vertically raised), the locking surface 116 of the locking member 110 disengages from the keeper 200 and the locking member 110 is biased so as to automatically return to the unlocked position (shown in FIGS. 1-3). In the unlocked position, the locking member 110 retracts at least partially within the housing 104 so that the window sash 102 can slide within the window jamb. As described above, in the unlocked position the locking member 110 still at least partially extends from the front of the housing 104 and/or the window sash 102. Accordingly, when the window sash 102 is tilted out of the window jamb, the tapered wings 122 engage and slide against the return legs of the window jamb, and this tilting movement of the window sash 102 depresses the locking member 110 into the housing 104. Thus, the locking member 110 is pivoted at least partially into the window sash 102 allowing the window sash 102 to tilt in and out of the window jamb without the locking member 110 catching on the window components. The notches 124 (shown in FIG. 1) within the housing 104 allow for the locking member 110 to depress at least partially into the housing 104 without the wings 122 contacting the sides of the housing 104. After the locking member 110 releases from the jamb during the tilting movement, the locking member 110 can again automatically return to the unlocked position. In an aspect, the window sash 102 needs to be raised out of the keeper 200 so that the sash 102 can tilt as required or desired.

In the example, a lower portion of the side rail 128 can have a pivot bar (not shown) extending outwards therefrom. The pivot bar is configured to engage with a window balance (also not shown) and enable the tilting movement of the window sash 102. The gap 208 of the keeper 200 that is sized and shaped to allow the pivot bar to pass through the keeper 200 during sliding operation of the window and/or during window installation. The gap 208, however, is small enough to prevent the locking member 110 from passing through so that the sash interlock 100 can engage with the keeper 200. For example, the width of the locking member 110 is greater than the gap 208. While a sliding and tilting window sash 102 is described herein, it should be appreciated that the sash interlock 100 can be used on only a sliding window sash as required or desired.

The sash interlock 100 locks and unlocks with respect to the keeper 200 automatically by the operation of the window sash 102. Additionally, the sash interlock 100 enables automatic retraction of the locking member 110 during tilting of the window sash 102. The sash interlock 100 can be used on either the upper sash or lower sash in a double hung window assembly and one or more sash interlocks 100 can be used to form a multi-point window lock system. For example, different sized locking members and keepers can be used for the lower locking member to pass through the upper keeper with no interference. Furthermore, the sash interlock 100 operates independently from all of the other window hardware (e.g., balances, tilt latches, top rail sash locks, etc.). By having wings 122 on both sides of the locking member 110, the sash interlock 100 can be installed on either side of the window without having to modify the orientation of the components within. In the examples described herein, the sash interlock 100 is mounted on a window system 126. It should be appreciated, however, that the sash interlock 100 can also be utilized in sliding door systems (not shown) as well and to increase security and/or structural performance of the sliding door.

Figure 8:
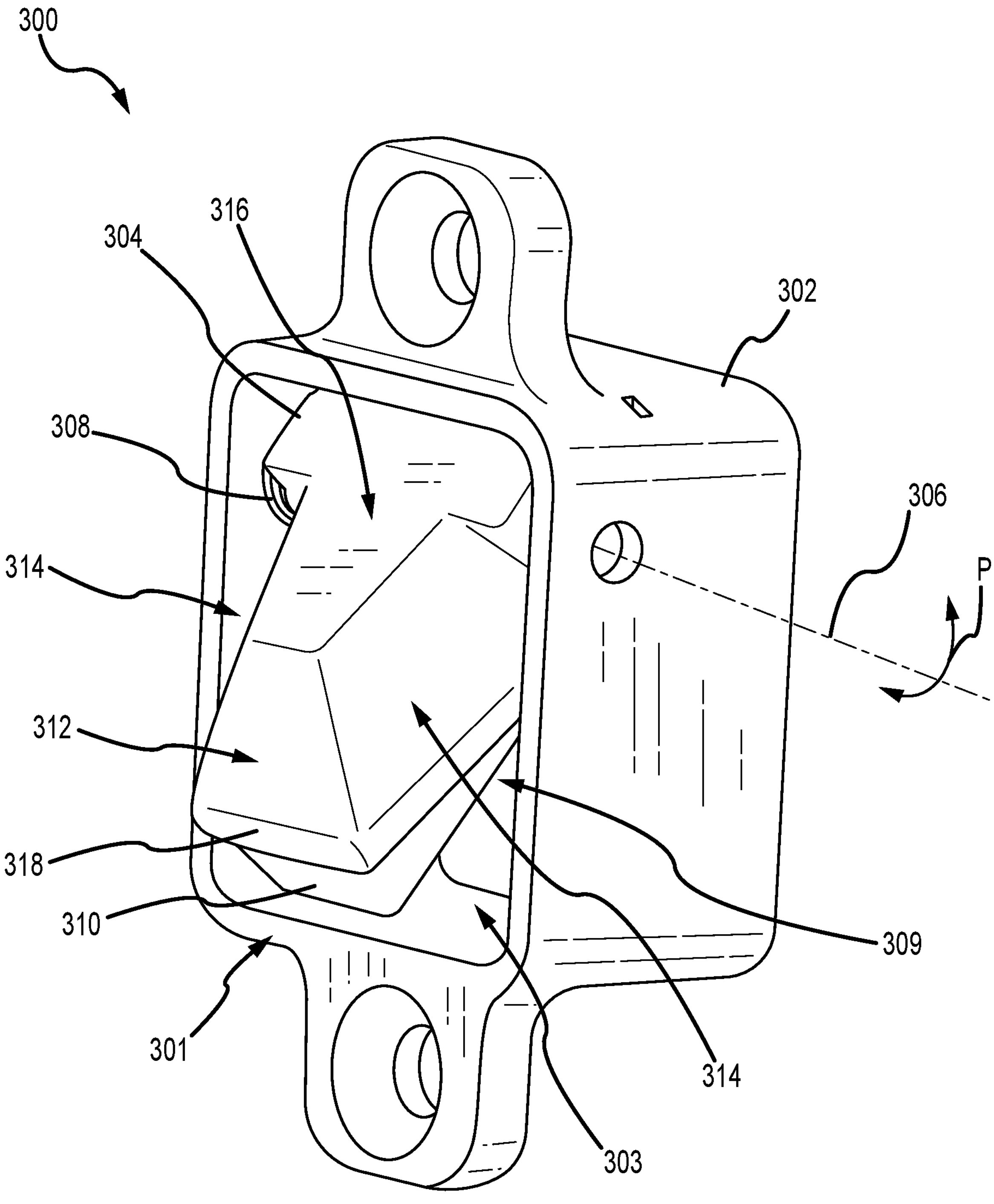
FIG. 8 is a perspective view of another sash interlock in an unlocked position.

FIG. 8 is a perspective view of another sash interlock 300 in an unlocked position. Similar to the example described above in FIGS. 1-7, the sash interlock 300 includes a housing 302 configured to mount to a window sash (e.g., the window sash 102 shown in FIG. 7) and defines a front face 301 and an interior cavity 303. A locking member 304 is pivotably mounted P at least partially within the housing 302 about a pivot axis 306. At least one biasing member 308 biases the locking member 304 with respect to the housing 302 into the unlocked position. In this example, however, the locking member 304 has a different shape than the example described above. The locking member 304 includes a locking surface 309 that faces the housing 302 and is disposed at least partially within the interior cavity 303. In the example, the locking surface 309 is substantially planar and includes a locking lug 310 that is disposed on the bottom of the locking member 304. An oblique front surface 312 relative to the locking lug 310 extends upward from the front end of the locking lug 310. Additionally, the locking member 304 includes a pair of tapered wings 314 disposed on both sides of the front surface 312 and tapering in an outwards direction. A stop surface 316 is disposed at the top of the locking member 304. In this example, by forming the locking member 304 in a more compact monolithic block with few or no protruding sections, the strength of the locking member 304 is increased.

In the unlocked position, a nose portion 318 of the locking member 304 that is defined between the locking lug 310 and the front surface 312 protrudes from the front face 301 of the housing 302 so that the member 304 can selectively engage with a keeper (e.g., the keeper 200 shown in FIG. 6). The configuration of the housing 302, locking member 304, and the biasing member 308 enables the locking member 304 to pivot P at least partially out and away from the interior cavity 303 of the housing 302 towards a locked position (shown in FIG. 9) when the window sash is closed. Additionally, the tapered wings 314 enable the locking member 304 to pivot P into the interior cavity 303 of the housing 302 towards a depressed position (shown in FIG. 10) when the window sash is tilted.

Figure 9:
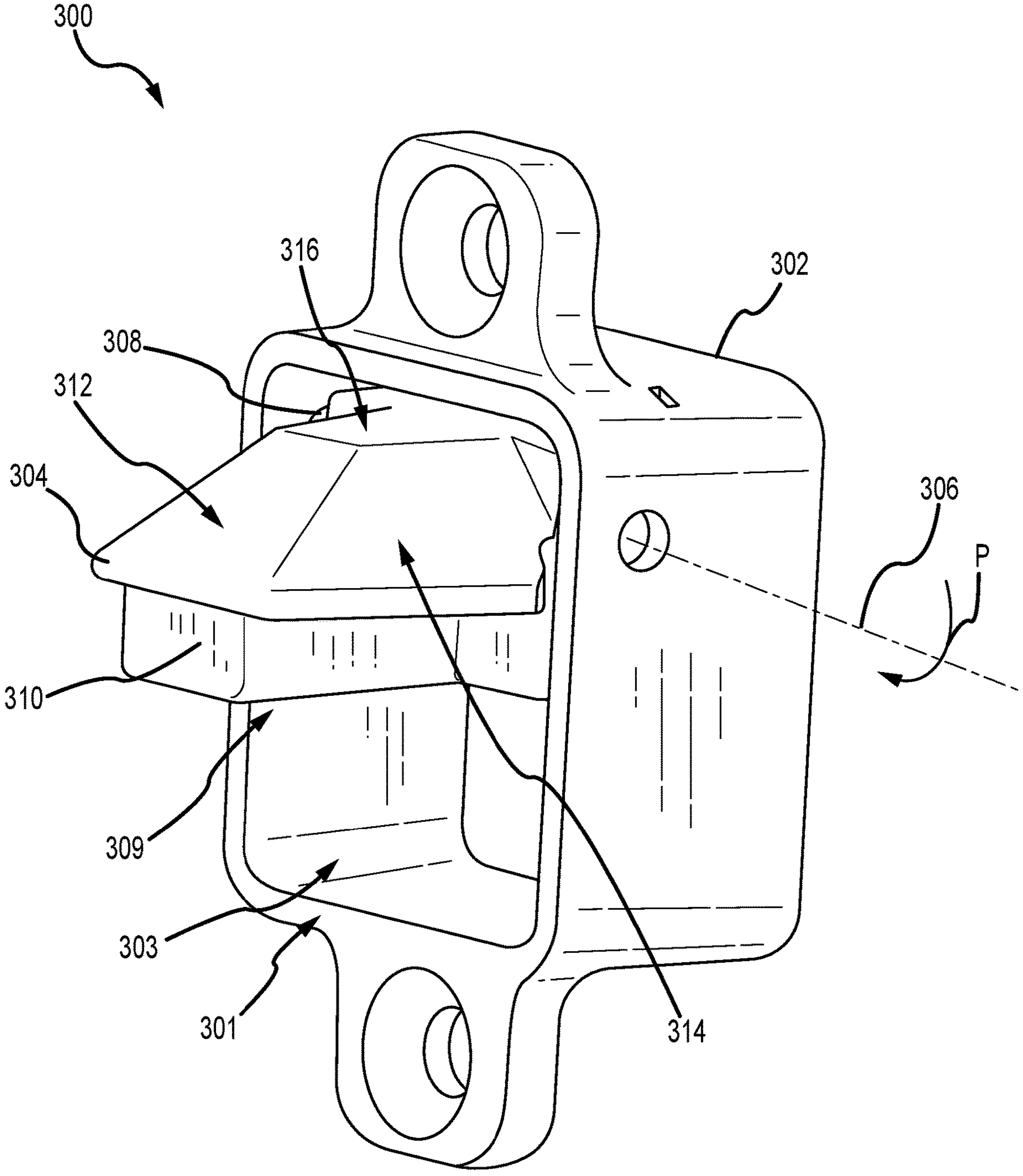
FIG. 9 is a perspective view of the sash interlock shown in FIG. 8 in a locked position.

FIG. 9 is a perspective view of the sash interlock 300 in a locked position. Certain components are described above, and thus, are not necessarily described further. In the locked position, the force of the biasing member 308 is overcome and the locking member 304 is pivoted P in an upward direction about the pivot axis 306 due to contact with a keeper (e.g., the keeper 200 shown in FIG. 6). In this example, the locking lug 310 is substantially rectangular in shape so that at least a portion of the lug 310 is received within the gap 208 (shown in FIG. 6) of the keeper 200 when engaged therewith. In an aspect, the locking lug 310 is recessed with regards to a perimeter of the front surface 312 and wings 314 so that the locking member 304 can more easily catch and engage with the window sash. The locking lug 310 enables the strength of the transverse engagement with the keeper to be increased and provide more design pressure and impact resistance to the window sash.

In the locked position, the locking surface 309 of the locking lug 310 can be oriented substantially orthogonal from the rear wall of the housing 302. In an aspect, the locking surface 309 is substantially parallel with the stop surface 316 on the locking member 304. Upon release of the locking member 304 from the locked position, the locking member 304 automatically returns towards the unlocked position (shown in FIG. 8).

Figure 10:
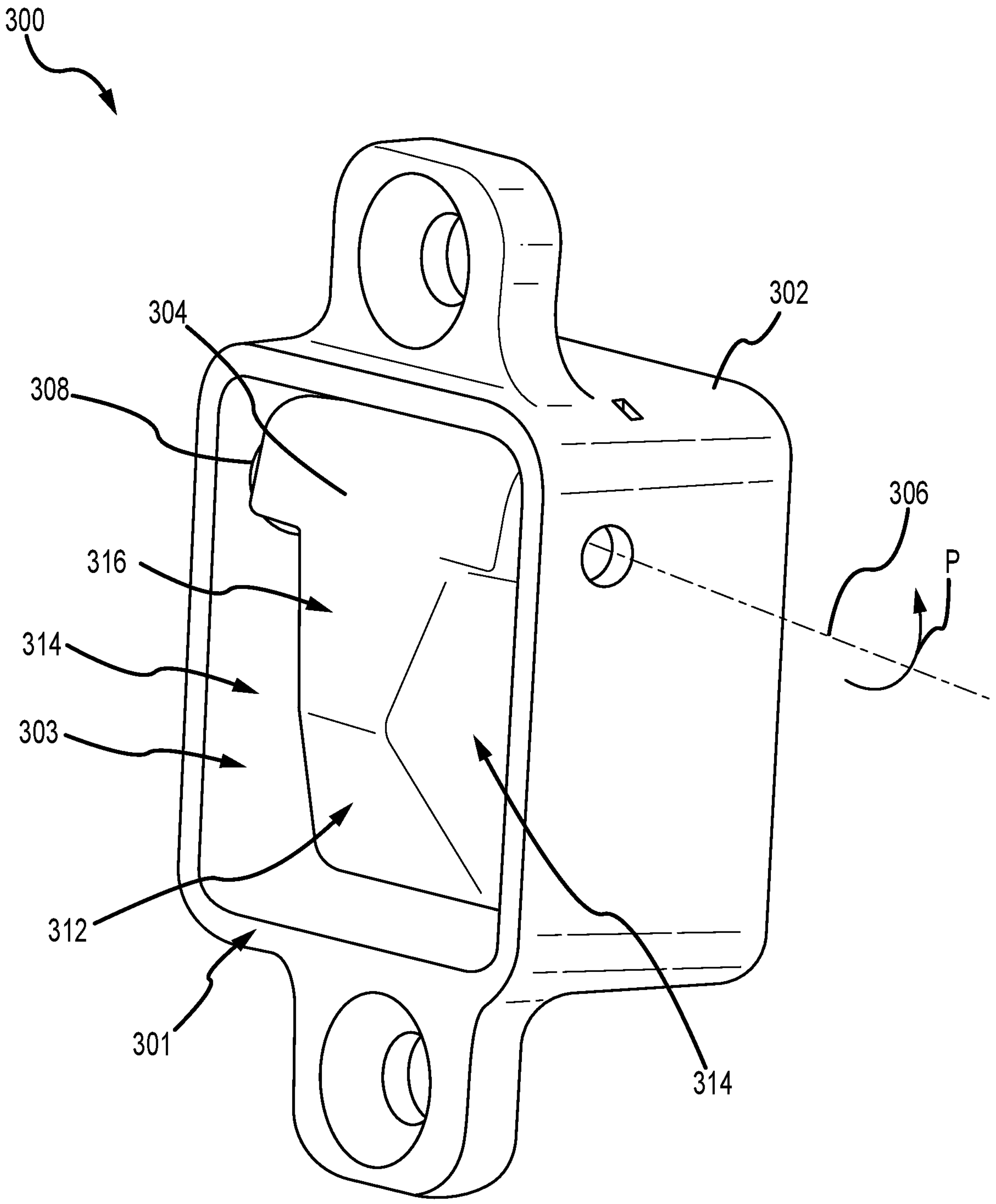
FIG. 10 is a perspective view of the sash interlock shown in FIG. 8 in a depressed position.

FIG. 10 is a perspective view of the sash interlock 300 in a depressed position. Certain components are described above, and thus, are not necessarily described further. In the depressed position, the wings 314 slide against the return legs of the window jamb so as to overcome the biasing force of the biasing member 308 and pivot P the locking member 304 into the interior cavity 303 of the housing 302 allowing the window sash to tilt as required or desired. In an aspect, the depressed position allows the locking member 304 to be depressed completely within the housing 302 so that the entire locking member 304 is behind the front face 301 of the housing 302. In another aspect, the locking member 304 may extend partially from the front face 301 in the depressed position and allow the window sash to tilt relative to the window jamb. Upon release of the locking member 304 from the depressed position, the locking member 304 automatically returns towards the unlocked position (shown in FIG. 8).

Figure 11:
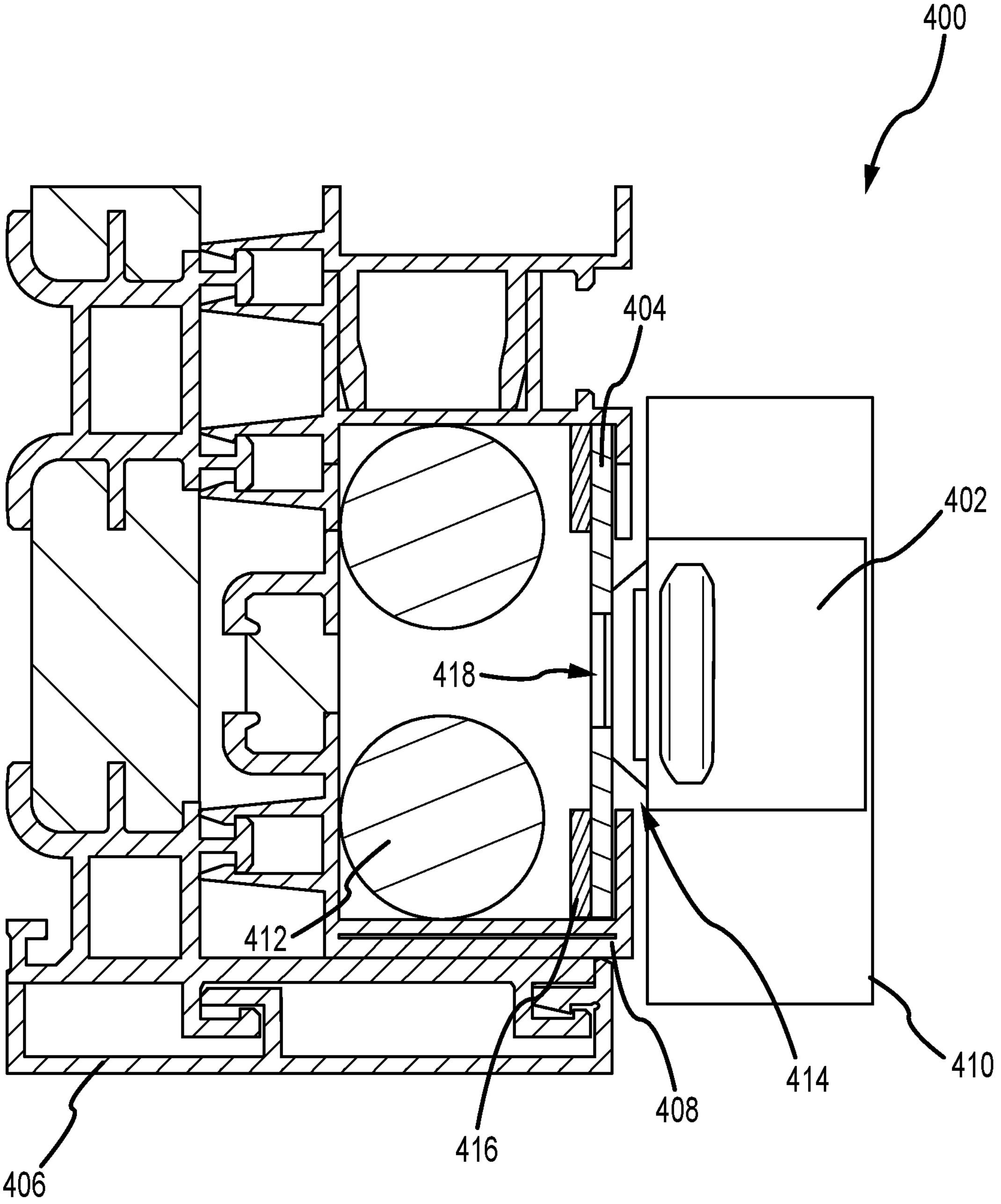
FIG. 11 is a plan view of an exemplary window system that includes a sash interlock and a keeper.

FIG. 11 is a plan view of an exemplary window system 400 that includes a sash interlock 402 and a keeper 404. The window system 400 includes a window frame 406 having a window jamb 408 with a window sash 410 mounted to the window jamb 408 via a window balance 412. The window balance 412 enables the window sash 410 to slide and tilt with respect to the window jamb 408. The sash interlock 402 is coupled to the window sash 410 at the side rail and the locking member is adjacent the window jamb and at least partially extending into, when in the unlocked position. The sash interlock 402 can be the sash interlock 100, 300 described above. The window jamb 408 is a substantially C-shaped channel with a front slot 414 defined between two return legs that slidably receives a portion of the locking member of the sash interlock 402.

In the example, the keeper 404 is coupled to the window jamb 408 proximate the front slot 414. The keeper 404 is mounted and secured within the window jamb 408. In an aspect, the window jamb 408 may include an additional leg 416 with the keeper 404 disposed between the leg 416 and the jamb 408. The keeper 404 can be a substantially flat plate that is secured to the jamb 408. This configuration provides space within the window jamb 408 so that the window balance 412 can function as normal and without any modifications. The keeper 404 has with a gap 418 so that a pivot bar (not shown) of the window sash 410 can slide through the keeper 404 and without engagement of the keeper 404. The keeper 404, however, is configured to engage with the sash interlock 402 as described herein. In an example, a width of the front slot 414 of the jamb 408 is greater than or equal to about ⅞-inch and a width of the pivot bar is about 5⁄16-inch. As such, the gap 418 of the keeper 404 is greater than 5⁄16-inch but less than a width of the locking member of the sash interlock 402. A width of the locking member of the sash interlock 402 can be about ½-inch so that the pivot bar can pass through the keeper 404 while the sash interlock 402 is configured to engage with the keeper 404.

Figure 12:
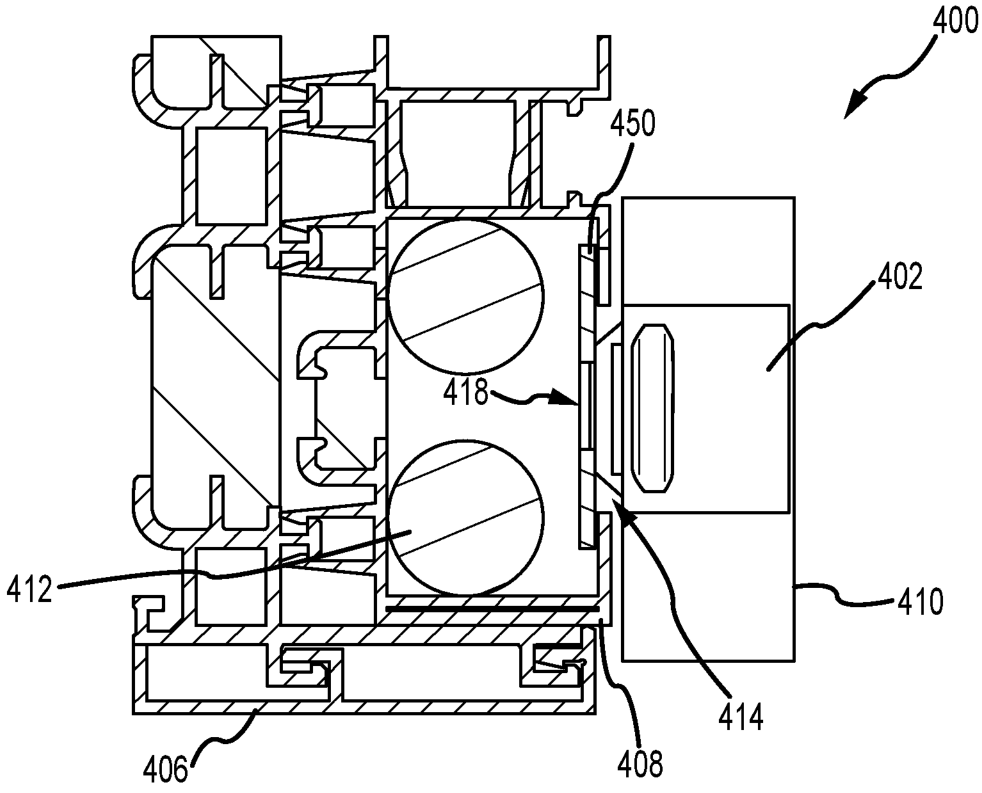
FIG. 12 is a plan view of the window system shown in FIG. 11 that includes the sash interlock and a different keeper.

FIG. 12 is a plan view of the window system 400 that includes the sash interlock 402 and a different keeper 450. Certain components are described above in reference to FIG. 11, and thus, are not necessarily described further. In this example, the keeper 450 can be a substantially flat plate that is configured to mount to an inner surface of the window jamb 408. In an example, the keeper 450 and/or the window jamb 408 can be tapped and threaded to receive a fastener (not shown). The fastener is small enough to not restrict functionality of the window balance 412 within the window jamb 408.

Figure 13:
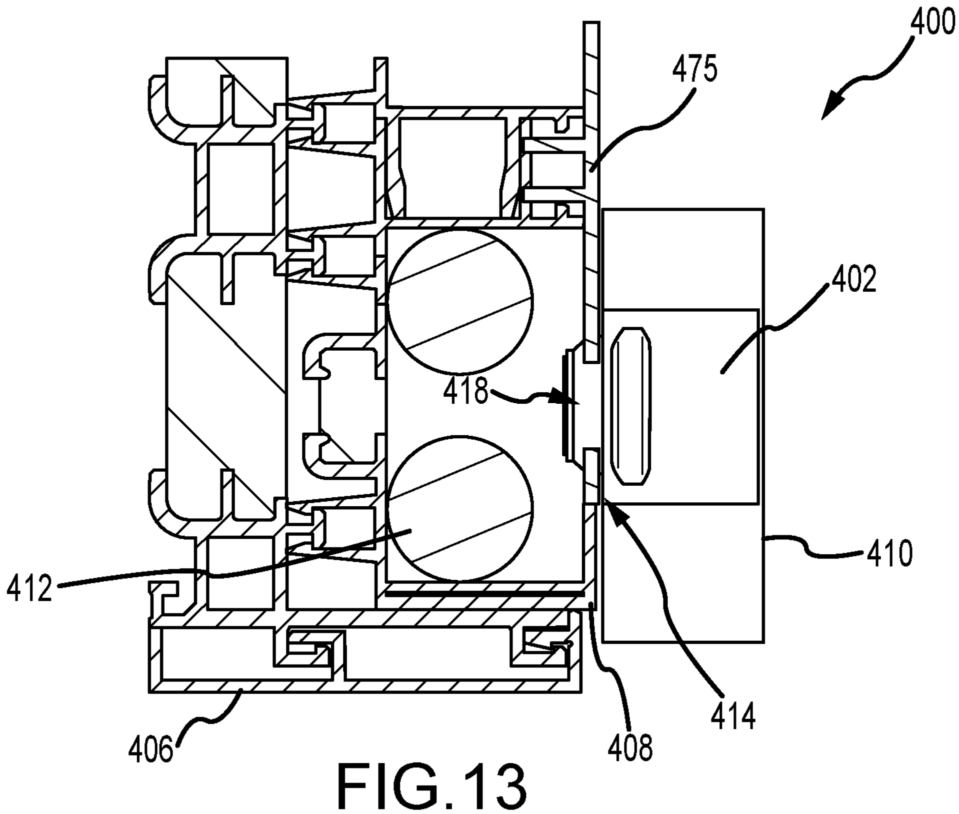
FIG. 13 is a plan view of the window system shown in FIG. 11 that includes the sash interlock and another keeper.

FIG. 13 is a plan view of the window system 400 that includes the sash interlock 402 and another keeper 475. Certain components are described above in reference to FIG. 11, and thus, are not necessarily described further. In this example, the keeper 475 is formed as a removable cover that replaces at least a portion of the window jamb 408. For example, the keeper 475 is configured to form part of the C-shaped channel and have an extension so that the keeper 475 can couple to a portion of the window jamb extrusion component. The keeper 475 is removable so that access to the window balance 412 is still provided. By forming the keeper 475 as part of the window jamb 408, the interior space of the jamb remains the same and so that the window balance 412 can operate as normal and without any modifications.

The materials utilized in the manufacture of the interlock components described herein may be those typically utilized for lock manufacture, e.g., zinc, steel, aluminum, brass, stainless steel, etc. Molded plastics, such as PVC, polyethylene, etc., may be utilized for the various components. Material selection for most of the components may be based on the proposed use of the locking system. Appropriate materials may be selected for mounting systems used on particularly heavy panels, as well as on hinges subject to certain environmental conditions (e.g., moisture, corrosive atmospheres, etc.).

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A window sash interlock comprising:

a housing configured to mount to a side rail of a window sash, wherein the housing comprises a front face that substantially aligns with a surface of the side rail; and a locking member pivotably coupled to the housing about a pivot axis, wherein the locking member is disposed at least partially within the housing, wherein the locking member is movable between at least a locked position and an unlocked position, wherein the locking member is biased so as to automatically return to the unlocked position, and wherein in the unlocked position, the locking member at least partially extends from the front face of the housing, wherein the locking member is configured to be depressed at least partially within the housing from the unlocked position, wherein the locking member comprises at least one wing configured to engage with a window jamb to depress the locking member when the window sash tilts, and wherein in the locked position, the locking member at least partially extends from the front face of the housing.

2. The window sash interlock of claim 1, wherein the locking member comprises a locking surface configured to engage with a keeper to move the locking member from the unlocked position towards the locked position.

3. The window sash interlock of claim 1, further comprising a keeper configured to mount to a window jamb, wherein the keeper comprises a bottom edge and two opposing side edges.

4. The window sash interlock of claim 3, wherein a gap is defined in the bottom edge of the keeper shaped and sized to allow a pivot bar of the window sash to pass through.

5. A sash interlock comprising:

a housing configured to mount to a side rail of a window sash and defining an interior cavity, wherein the interior cavity is open at a front face of the housing;

a locking member pivotably coupled to the housing at a pivot axis and disposed at least partially within the interior cavity, wherein the locking member comprises a locking surface and a front surface, and wherein the locking member also comprises a pair of tapered wings extending from the front face; and at least one biasing member coupled to the locking member and disposed within the interior cavity, wherein the at least one biasing member is configured to bias the locking member towards an unlocked position relative to the front face of the housing, wherein in the unlocked position at least a portion of the front surface extends from the front face of the housing and the side rail of the window sash, wherein the locking member is pivotable in either direction around the pivot axis from the unlocked position, and wherein a pair of notches are defined in the housing at the front face sized and shaped to selectively receive at least a portion of the pair of tapered wings.

6. The sash interlock of claim 5, wherein the locking surface is curved.

7. The sash interlock of claim 5, wherein the locking surface comprises a locking lug.

8. The sash interlock of claim 5, wherein the at least one biasing member comprises a torsion spring.

9. The sash interlock of claim 5, wherein the locking member is pivotable around the pivot axis further in a direction that is out of the interior cavity than in a direction that is into the interior cavity relative to the unlocked position.

10. A window sash interlock comprising:

a housing configured to mount to a side rail of a window sash, wherein the housing comprises a front face that substantially aligns with a surface of the side rail; and a locking member pivotably coupled to the housing about a pivot axis, wherein the locking member is disposed at least partially within the housing, wherein the locking member is movable between at least a locked position and an unlocked position, wherein the locking member is biased so as to automatically return to the unlocked position, wherein in the unlocked position, the locking member at least partially extends from the front face of the housing, wherein the locking member is configured to be depressed at least partially within the housing from the unlocked position, and wherein the locking member comprises at least one wing configured to engage with a window jamb to depress the locking member when the window sash tilts.

11. The window sash interlock of claim 10, wherein the locking member includes a locking surface that is curved.

12. The window sash interlock of claim 10, wherein the locking member includes a locking surface that comprises a locking lug.

13. The window sash interlock of claim 10, wherein the locking member comprises a front face and a pair of tapered wings extending from the front face.

14. The window sash interlock of claim 10, further comprising a keeper configured to mount to a window jamb, wherein the keeper comprises a bottom edge and two opposing side edges.

* * * * *